Patented Nov. 21, 1933

1,935,706

UNITED STATES PATENT OFFICE 1,935,706

ART OF PRESERVING BIOLOGICAL SPECIMENS

Philip Joffe, New York, N. Y.

No Drawing. Application April 8, 1929
Serial No. 353,657

9 Claims. (Cl. 99—8)

The invention aims to produce biological specimens such as flowers, leaves, insects, etc., which will be permanently preserved as regards form and/or color and texture.

I have discovered that if a biological specimen of the above nature be coated with certain substances of the nature hereinafter described, while such substances are in liquid condition, and the liquid coating be then rapidly solidified on the specimen, the water content of the specimen will thereby be largely removed without impairing its form, and that the natural form and color of the specimen will thereafter be preserved indefinitely even though the coating be removed soon after solidification.

A specimen so treated may be reinforced to assist in maintaining its form during handling or use, either by leaving the above mentioned coating upon it or by superimposing other coatings thereon, or substituting the same therefor as is hereinafter described in greater detail.

I have found substances which assume a crystalline form when in solid condition to be capable of producing the above results, provided their melting points are low enough to allow the application of a liquid coating of such substances without breaking down the structure of the specimen, it being understood, of course, that such substances should be inert to the specimen in the sense that its structure will not be destroyed by chemical reaction. The step of liquefaction tends to drive out the moisture content of such substances and thereby render them capable of removing rapidly the moisture content of a biological specimen, when the latter is coated therewith. As examples of the above substances, camphor, naphthalene, paradichlorbenzene, chloral hydrate, terpin hydrate, thymol, phenyl salicylate, or mixtures thereof, may be mentioned, said respective substances melting at temperatures ranging between about 43° C. and 175° C., which temperatures will not injure most biological specimens, at least if subjected thereto for only a very short period of time.

The heat of the melted substances causes a rapid loss or removal by evaporation of the natural moisture content of the specimen, the rapidity of the moisture removal or extraction depending upon the degree of heat of the melted substance and upon the length of time the specimen is subjected to its heat. This rapid loss of moisture if continued too long may cause a collapse of the form of the specimen, especially in the case of leaves and flowers. Substances should therefore be employed which rapidly form a solidified coating about the specimen, when the latter is withdrawn from the source of heat so that the form of the specimen may be permanently retained.

I have found that substances which assume a crystalline form when solid are best suited to meet the foregoing requirements. Their porosity quickly absorbs the moisture which has been released from the specimen as above referred to.

The above substances are also inert to most biological specimens in the sense above defined, and solidify very quickly after the coating is separated from the source of heat employed to melt it, if not overheated, thereby forming a solid coating on the specimen which fixes it in proper form and shape. Furthermore, certain of the above mentioned classes of substances, such as paradichlorbenzene, camphor and naphthalene, are sublimable and hence, if desired, the solid coating may be easily removed merely by permitting the coated specimens to stand. The above classes of substances are, furthermore, generally speaking, quite transparent, when in the form of a thin coating, hence the coating does not unduly obscure the natural color of the specimen.

In practicing the invention the water removing substance will be melted and the biological specimen coated therewith in any suitable manner as by spraying, sprinkling, or dipping; in the use of camphor, for example, which has a melting point of about 175° C., a flower to be preserved may be dipped in a bath of liquid camphor heated just enough to keep it liquid, and immediately removed therefrom, since the temperature will be sufficient to cause the flower to collapse if it is allowed to remain in the bath for only a few seconds. Immediately after the flower is withdrawn from the bath the coating of camphor solidifies and it will be found that the water content of the flower has been largely removed, even though the camphor coating be removed soon after solidification as may be done by washing the flower with known solvents of camphor or, in fact, the camphor coating will gradually volatilize and disappear if the flower is merely permitted to stand.

This treatment leaves the color and form of the flower unimpaired although, particularly if the coating be removed, the flower may not be strong enough to be subjected to rough handling or wear.

The flower may be reinforced if desired by superimposing upon the camphor coating, or directly upon the flower, if the camphor coating has been removed, a stiffening coating, preferably transparent, such as lacquer, varnish, water glass or the like. I have found pyroxylin lacquers well suited for this purpose being quite transparent and rapid drying.

The treatment will be substantially the same employing any of the water removing substances as above mentioned, except that in each case it is only necessary to heat the substance to its melting point or slightly thereabove; the melting points of the other respective substances above mentioned are lower than that of camphor, and therefore less likely to injure the color or form of the flower, the melting point of phenyl salicylate, for example, being about 43° C. and in each case the specimen to be treated should be only momentarily subjected to the temperature of the melted coating substance, and such coating solidified on the specimen as rapidly as possible, to set the specimen in proper form.

In cases where delicate shades of color are desired to be preserved, which might be affected by the heat of the melted coating substances, it is important to add small amounts of a color preservative such as salicylic acid, benzoic acid or sulphurous acid to such coating substances. I have found salicylic acid to be preferable for most purposes.

If desired the preserved specimens, coated with a substance of the class above described or with a stiffening coating as above described, or after the preservative coating has been removed, may be artificially colored or gilded, or the process may be employed, if desired, merely to preserve the form of the specimen, and remove its color, by treating the specimen, after removing its water as above described, with an alcohol or other color solvent, and then applying a stiffening coating to give the effect of a glass specimen.

The process is particularly adapted to the treatment of flowers and leaves to obtain specimens effectively preserved in their natural form and color, and in most instances I prefer to employ paradichlorbenzene or naphthalene as the preservative, on account of the fact that both are fairly cheap, melt at moderate temperatures, are solid at ordinary room temperatures, solidify quickly and are otherwise easy to operate with, are quite transparent and evaporate or volatilize rapidly after solidification by mere exposure to the air, so that a reinforcing coating may be so placed on the preserved specimen without giving it a thick and heavy appearance.

It is possible to treat flowers while carried by live plants, as above described, after which the blooms become permanent without destroying the life of the plant. The widest application of the invention, however, is in the treatment of cut flowers to enable them to serve as permanent decorations. This application contains subject matter previously disclosed in my prior application Serial Number 285,790, filed June 15, 1928, entitled "Art of preserving biological specimens".

While certain specific procedures for carrying out the invention have been given above, it will be obvious that many changes may be made in such disclosure without departing from the important features, within the scope of the appended claims.

I claim:

1. The method of preserving the form and color of biological specimens which includes coating the same with a liquefied water removing substance which assumes a crystalline form when in solid condition and which has a relatively low melting point, and rapidly solidifying such coating on the specimen.

2. The method of preserving the form and color of biological specimens which includes treating the same with a color preservative, coating the same with a liquefied substance which assumes a crystalline form upon solidification and which has a relatively low melting point, and then rapidly solidifying such coating on the specimen.

3. The method of preserving the form and color of biological specimens which includes coating the same with a liquefied water removing substance which assumes a crystalline form when in solid condition and which has a relatively low melting point, rapidly solidifying such coating on the specimen and then removing such coating from the specimen.

4. The method of preserving the form and color of biological specimens which includes coating the same with a liquefied water removing substance which assumes a crystalline form when in solid condition and which has a relatively low melting point, rapidly solidifying such coating on the specimen and applying a reinforcing coating to such specimen.

5. The method of preserving the form and color of biological specimens which includes coating the same with a liquefied water removing substance which assumes a crystalline form when in solid condition and which has a relatively low melting point, rapidly solidifying such coating on the specimen and then removing such coating from the specimen and applying a reinforcing coating thereto.

6. The method of preserving the form and color of biological specimens which includes coating the same with a liquefied water removing sublimable substance which assumes a crystalline form when in solid condition and which has a relatively low melting point, rapidly solidifying such coating on the specimen and then evaporating such coating by sublimation.

7. The method of preserving biological specimens which includes coating the same with liquefied naphthalene, and rapidly solidifying said coating on the specimen.

8. The method of preserving biological specimens which includes coating the same with liquefied paradichlorbenzene, and rapidly solidifying said coating on the specimen.

9. The method of preserving biological specimens which includes coating the same with liquefied camphor, and rapidly solidifying said coating on the specimen.

PHILIP JOFFE.